US010205946B2

(12) United States Patent
Kaneko et al.

(10) Patent No.: US 10,205,946 B2
(45) Date of Patent: Feb. 12, 2019

(54) IMAGE PROCESSING APPARATUS AND IMAGE PROCESSING METHOD

(71) Applicant: CANON KABUSHIKI KAISHA, Tokyo (JP)

(72) Inventors: Yushi Kaneko, Kawasaki (JP); Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 15/139,008

(22) Filed: Apr. 26, 2016

(65) Prior Publication Data

US 2016/0323578 A1   Nov. 3, 2016

(30) Foreign Application Priority Data

Apr. 28, 2015 (JP) ................. 2015-092371

(51) Int. Cl.
| | |
|---|---|
| H04N 11/14 | (2006.01) |
| H04N 19/124 | (2014.01) |
| H04N 19/134 | (2014.01) |
| H04N 19/176 | (2014.01) |
| H04N 19/192 | (2014.01) |
| H04N 11/04 | (2006.01) |
| H04N 19/146 | (2014.01) |

(52) U.S. Cl.
CPC ......... *H04N 19/124* (2014.11); *H04N 11/046* (2013.01); *H04N 19/146* (2014.11); *H04N 19/176* (2014.11); *H04N 19/192* (2014.11)

(58) Field of Classification Search
CPC .. H04N 11/046; H04N 19/124; H04N 19/146; H04N 19/176; H04N 19/192

USPC ......................................................... 375/240
See application file for complete search history.

(56) References Cited

U.S. PATENT DOCUMENTS

| | | | |
|---|---|---|---|
| 5,778,339 A | 7/1998 | Sonohara et al. | |
| 5,949,956 A * | 9/1999 | Fukuda | H04N 5/9264 348/384.1 |
| 6,414,992 B1 | 7/2002 | Sriram et al. | |
| 7,444,031 B2 | 10/2008 | Fukuzara | |
| 8,718,391 B2 * | 5/2014 | Lee | H04N 19/00 382/232 |
| 2005/0015248 A1 * | 1/2005 | Kadono | G11B 20/1426 704/230 |
| 2011/0292247 A1 * | 12/2011 | Gharavi-Alkhansari | H04N 19/176 348/231.99 |
| 2013/0251257 A1 * | 9/2013 | Ohnishi | G06T 9/00 382/166 |

(Continued)

FOREIGN PATENT DOCUMENTS

JP   2010-004514 A   1/2010

*Primary Examiner* — Deirdre L Beasley
(74) *Attorney, Agent, or Firm* — Cowan, Liebowitz & Latman, P.C.

(57) ABSTRACT

An image processing apparatus comprising, an acquiring unit configured to acquire an encoding target block having a plurality of groups each including a predetermined number of pixels, a deciding unit configured to decide for each group a quantization parameter used to quantize image data of the group and an encoding scheme so that a code length of the encoding target block does not exceed a predetermined value, and an encoding unit configured to generate encoded data by encoding image data of the encoding target block in accordance with the quantization parameters and the encoding schemes decided for the respective groups by the deciding unit.

12 Claims, 10 Drawing Sheets

(56) References Cited

U.S. PATENT DOCUMENTS

2016/0366409 A1* 12/2016 Ranjan ................ H04N 19/124

* cited by examiner

F I G. 4A

| GROUP NUMBER | 0 | | | 1 | | | 2 | | | ... | 15 | | |
|---|---|---|---|---|---|---|---|---|---|---|---|---|---|
| PIXEL NUMBER | 0 | 1 | 2 | 3 | 4 | 5 | 6 | 7 | 8 | ... | 45 | 46 | 47 |
| IMAGE DATA | R0 | G0 | B0 | R1 | G1 | B1 | R2 | G2 | B2 | ... | R15 | G15 | B15 |

F I G. 4B

| GROUP NUMBER | 0 | | | | | | | | | | | | 1 | | | | | | | | | | | | 2 | | | | ... | 7 | | | |
|---|---|---|---|---|---|---|---|---|---|---|---|---|---|---|---|---|---|---|---|---|---|---|---|---|---|---|---|---|---|---|---|---|---|
| PIXEL NUMBER | 0 | 1 | 2 | 3 | | | | | | | | | | | | 4 | 5 | 6 | 7 | | | | | | 8 | 9 | 10 | 11 | ... | 28 | 29 | 30 | 31 |
| IMAGE DATA | Cb0 | Y0 | Cr0 | Y1 | | | | | | | | | | | | Cb1 | Y2 | Cr1 | Y3 | | | | | | Cb2 | Y4 | Cr2 | Y5 | ... | Cb7 | Y14 | Cr7 | Y15 |

(Simplified for F I G. 4B)

| GROUP NUMBER | 0 | | | | 1 | | | | 2 | | | | ... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ... | 28 | 29 | 30 | 31 |
| IMAGE DATA | Cb0 | Y0 | Cr0 | Y1 | Cb1 | Y2 | Cr1 | Y3 | Cb2 | Y4 | Cr2 | Y5 | ... | Cb7 | Y14 | Cr7 | Y15 |

F I G. 4C

| GROUP NUMBER | 0 | | | | 1 | | | | 2 | | | | ... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ... | 28 | 29 | 30 | 31 |
| IMAGE DATA | R0 | Gr0 | Gb0 | B0 | R1 | Gr1 | Gb1 | B1 | R2 | Gr2 | Gb2 | B2 | ... | R7 | Gr7 | Gb7 | B7 |

FIG. 9A

| QP | Pixel Group Number | | | | | | | | | | | | | | | | | HEADER CODE LENGTH | BLOCK CODE LENGTH |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 30 | 30 | 30 | 22 | 24 | 18 | 17 | 15 | 16 | 22 | 20 | 22 | 12 | 20 | 18 | 18 | 48 | 382 |
| 1 | 27 | 27 | 27 | 22 | 23 | 18 | 15 | 15 | 16 | 22 | 17 | 18 | 12 | 20 | 18 | 18 | 48 | 363 |
| 2 | 24 | 24 | 24 | 18 | 19 | 15 | 13 | 13 | 16 | 18 | 17 | 15 | 12 | 16 | 18 | 16 | 48 | 326 |
| 3 | 21 | 21 | 21 | 14 | 15 | 15 | 12 | 12 | 15 | 15 | 15 | 13 | 12 | 14 | 14 | 16 | 48 | 293 |

FIG. 9B

| QP | Pixel Group Number | | | | | | | | | | | | | | | | | HEADER CODE LENGTH | BLOCK CODE LENGTH |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 30 | 30 | 30 | 22 | 24 | 18 | 17 | 15 | 16 | 22 | 20 | 22 | 12 | 20 | 18 | 18 | 48 | 382 |
| 1 | 27 | 27 | 27 | 22 | 23 | 18 | 15 | 15 | 16 | 22 | 17 | 18 | 12 | 20 | 18 | 18 | 48 | 363 |
| 2 | 24 | 24 | 24 | 18 | 19 | 15 | 13 | 13 | 16 | 18 | 17 | 15 | 12 | 16 | 18 | 16 | 48 | 326 |
| 3 | 21 | 21 | 21 | 14 | 15 | 15 | 12 | 12 | 15 | 15 | 15 | 13 | 12 | 14 | 14 | 16 | 48 | 293 |

FIG. 9C

| QP | Pixel Group Number | | | | | | | | | | | | | | | | | HEADER CODE LENGTH | BLOCK CODE LENGTH |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 30 | 30 | 30 | 22 | 24 | 18 | 17 | 15 | 16 | 22 | 20 | 22 | 12 | 20 | 18 | 18 | 48 | 382 |
| 1 | 27 | 27 | 27 | 22 | 23 | 18 | 15 | 15 | 16 | 22 | 17 | 18 | 12 | 20 | 18 | 18 | 48 | 363 |
| 2 | 24 | 24 | 24 | 18 | 19 | 15 | 13 | 13 | 16 | 18 | 17 | 15 | 12 | 16 | 18 | 16 | 48 | 326 |
| 3 | 21 | 21 | 21 | 14 | 15 | 15 | 12 | 12 | 15 | 15 | 15 | 13 | 12 | 14 | 14 | 16 | 48 | 293 |

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

In recent years, for image capturing apparatuses such as those for digital video or the like, the image data amount handled in a system has increased significantly in accompaniment of an increase in resolution and an increase in frame rates, and there is demand for acceleration of image memory and bus interface circuits. With respect to this, it is possible to handle demand for circuit acceleration by reducing the image data amount by performing compression encoding of image data for image memory and for a bus interface.

In such a case, it is desired that the encoding scheme for image compression have a small circuit scale, and a short encoding delay. Therefore, it is unsuitable in conventional DCT-based encoding schemes as typified by the JPEG and MPEG2. Accordingly, a proposal has been made for a DPCM (Differential Pulse Code Modulation) based predictive encoding scheme (refer to Japanese Patent Laid-Open No. 2010-004514).

In a DPCM-based predictive encoding scheme, a degradation of image quality tends to occur at an edge portion where a change in pixel levels is large. In the proposed scheme of Japanese Patent Laid-Open No. 2010-004514, encoding with low image quality degradation is possible if a difference in values between adjacent pixel data is less than or equal to a predetermined threshold. However, if the difference in values between adjacent pixel data exceeds a predetermined threshold as with a sharp edge portion, it is necessary to half the original pixel data bits by quantization (for example, to turn 10 bits into 5 bits), and this becomes a major cause of image quality degradation. Similarly, it becomes a major cause of image quality degradation if the difference between a predicted image and an encoding target image is large.

SUMMARY OF THE INVENTION

The present invention reduces a degradation of image quality in a portion for which a difference between pixels is large such as a sharp edge portion by performing encoding efficiently.

One aspect of embodiments of the invention relates to an image processing apparatus comprising an acquiring unit configured to acquire an encoding target block having a plurality of groups each including a predetermined number of pixels, a deciding unit configured to decide for each group a quantization parameter used to quantize image data of the group and an encoding scheme so that a code length of the encoding target block does not exceed a predetermined value, and an encoding unit configured to generate encoded data by encoding image data of the encoding target block in accordance with the quantization parameters and the encoding schemes decided for the respective groups by the deciding unit, wherein the encoding unit encodes the image data using a first encoding scheme that outputs quantized image data and a second encoding scheme that outputs encoded data of a differential between quantized image data and prediction data, wherein the deciding unit decides, as the encoding scheme of the respective groups, whichever of the first encoding scheme and the second encoding scheme that can obtain a smaller code length, and wherein the deciding unit decides, as the quantization parameter of the respective groups, either a first quantization parameter or a second quantization parameter corresponding to a quantization step smaller than a quantization step corresponding to the first quantization parameter, out of a plurality of quantization parameters, and wherein the deciding unit decides one of the plurality of quantization parameters as the first quantization parameter so that a code length of encoded data of the encoding target block generated by quantizing all of the groups of the encoding target block using the first quantization parameter, and encoding the respective groups using the encoding schemes decided for the respective groups does not exceed the predetermined value, and becomes a maximum value, and decides the second quantization parameter as a quantization parameter for some of the groups of the encoding target block.

Further features of the present invention will become apparent from the following description of exemplary embodiments (with reference to the attached drawings).

BRIEF DESCRIPTION OF THE DRAWINGS

FIG. 4A to FIG. 4C are views for explaining a relationship between a pixel group and pixel data that configures an encoding block.

FIG. 9A to FIG. 9C are views that illustrate an example of selected QPs and code lengths of pixel group units corresponding to an embodiment of the invention.

DESCRIPTION OF THE EMBODIMENTS

Hereinafter, detailed explanation is given for embodiments of the invention with reference to the attached drawings.

[First Embodiment]

(Explanation of Image Processing Apparatus)

Figure 1A:
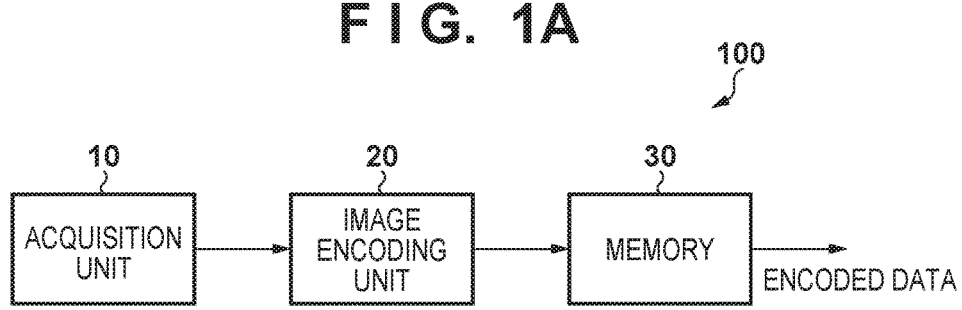
FIG. 1A is a block diagram for illustrating an example configuration of an image processing apparatus corresponding to an embodiment of the invention.

Hereinafter, explanation is given of an image processing apparatus corresponding to an embodiment of the invention. FIG. 1A is a view for illustrating an example configuration of an image processing apparatus in embodiments of the invention. An image processing apparatus 100 has an acquisition unit 10, an image encoding unit 20 and a memory 30, for example. In the image processing apparatus 100 of FIG. 1A, each block, except for physical devices such as image capturing elements and display elements, may be configured in hardware using a dedicated device, a logic circuit, a memory or the like. Alternatively, they may be configured in software by a computer such as a CPU executing a processing program stored in a memory. The image processing apparatus 100 can be implemented as a digital camera, for example. In addition to this, it is possible to make it an information processing terminal or image capturing apparatus such as, for example, a personal computer, a mobile telephone, a smart phone, a PDA, a tablet terminal, a digital video camera, or the like.

In FIG. 1A, the acquisition unit 10 has a function of inputting image data. The acquisition unit 10 includes a configuration for inputting image data via a transmission path from outside such as an image capturing unit equipped with an image sensor, for example. Alternatively, the acquisition unit 10 includes a configuration that reads image data from a recording medium. Also, the acquired image data may be still image data, and may also be moving image data. If the image data that the acquisition unit 10 acquires is moving image data, moving image data of a plurality of frames may be acquired consecutively.

The acquisition unit 10 supplies the acquired image data to the image encoding unit 20. The image encoding unit 20 outputs encoded data for which an amount of information is compressed by encoding the image data supplied from the acquisition unit 10 in accordance with an encoding scheme such as one of a pulse code modulation (PCM) or a differential pulse code modulation (DPCM). The outputted encoded data is stored in the memory 30. The memory 30 has a storage capacity necessary to store encoded data output from the image encoding unit 20. For the encoded data stored in the memory 30, image development processing and additional compression processing is implemented in a processing unit of a subsequent stage.

Additionally, in FIG. 1A, the acquisition unit, the image encoding unit 20 and the memory 30 are illustrated as independent configurations, but when implementing the image processing apparatus 100, these may be integrated together in 1 chip, for example, or may be configured independently as separate bodies.

(Explanation of Image Encoding Unit)

Figure 1B:
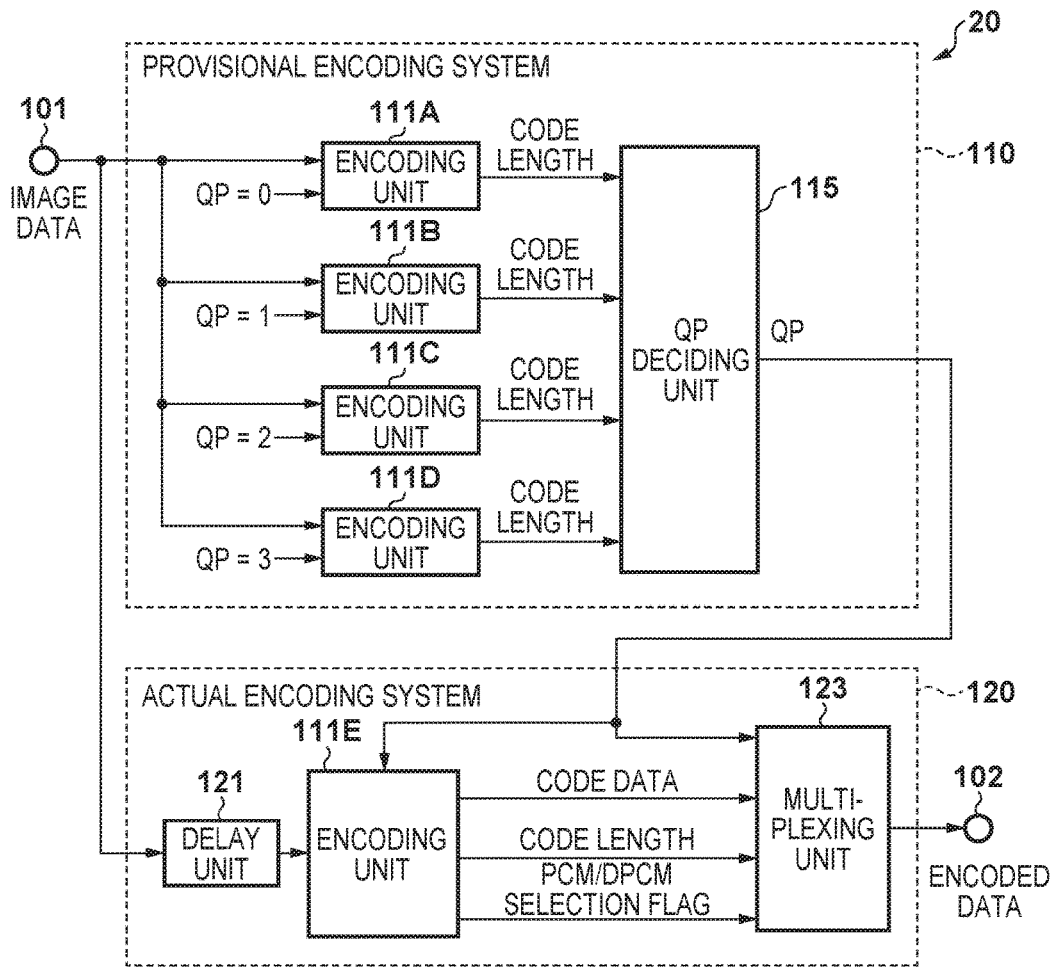
FIG. 1B is a block diagram for illustrating an example configuration of an image encoding unit corresponding to an embodiment of the invention.

Hereinafter, explanation is given of a configuration of the image encoding unit 20 corresponding to an embodiment of the invention with reference to FIG. 1B. FIG. 1B is a block diagram for illustrating an example configuration of the image encoding unit 20 corresponding to an embodiment of the invention. Hereinafter, explanation is given for operation of each block of the image encoding unit 20 of the present embodiment.

The image encoding unit 20 illustrated in FIG. 1A is configured by 2 large blocks of a provisional encoding system 110 and an actual encoding system 120. Furthermore, the provisional encoding system 110 is configured from encoding units 111A-111D and a QP deciding unit 115, and operates to decide a set of quantization parameters used when performing actual encoding by the actual encoding system 120. The actual encoding system 120 is comprised by a delay unit 121, an encoding unit 111E and a multiplexing unit 123, and operates so to execute actual encoding which includes quantization processing using the set of quantization parameters decided by the provisional encoding system 110. The image encoding unit 20 may be configured integrally in hardware using memory, a logic circuits and dedicated devices as an image encoding apparatus, or may be configured by distributing among a plurality of devices. Alternatively, it may be configured in software by a computer such as a CPU executing a processing program stored in a memory.

Image data which is an encoding target is inputted into the image encoding unit 20 from outside via an input terminal 101. In the present embodiment, explanation is given with RGB image data illustrated in FIG. 4A as an example of the format of the image data, but other data formats are also possible. Details of other data formats are explained with reference to FIG. 4B and FIG. 4C at the end of the present embodiment. Also, it is assumed that image data is inputted in a raster scan order, and each pixel data item of R (red), G (green) and B (blue), which respectively are color components are time-divisionally multiplexed and input sequentially. Also, the bit depth of each pixel is 10 bits, as an example.

(Explanation of Encoding Blocks and Pixel Groups)

In the present embodiment, it is assumed that in the image encoding processing that the image encoding unit 20 executes, the input image data is divided into blocks (hereinafter referred to as "encoding blocks") that have a predetermined size (number of pixels), and that encoding is performed in units of encoding blocks. Also, the encoding blocks are further divided into "pixel groups" comprising a predetermined number of one or more pixels. A pixel group is a unit for which later explained encoding method (PCM/DPCM) switching, and quantization parameter (hereinafter referred to as "QP") switching is performed. It is advantageous that pixel groups be configured by pixels having a high correlation such as pixels of the same coordinates or adjacent pixels, and they may be configured for a single color component, or may be configured for multiple color components.

In the present embodiment, 16 horizontal pixels×1 vertical pixel for each color component of RGB image data×3 colors=48 pixels is made to be an encoding block. Also, a total of 3 pixels—1 pixel for each color component—is made to be a pixel group.

FIG. 4A is a view for explaining a relationship between a pixel group and pixel data that configures an encoding block in the present embodiment. As illustrated in FIG. 4A, an encoding block is configured from 16 pixels for each of R, G and B color components. Also, a group number is assigned for each set of color components comprising R, G and B in accordance with the pixel position, and one of pixel numbers 0-47 is assigned for each pixel. For example, R0, G0 and B0, which respectively are first pixel data of color components, configure a pixel group whose group number is "0", and R1, G1 and B1, which are second pixel data, configure a pixel group whose group number is "1". In the present embodiment, the data of each pixel is referred to as "image data".

(Explanation of an Encoding Unit 111)

Figure 3:
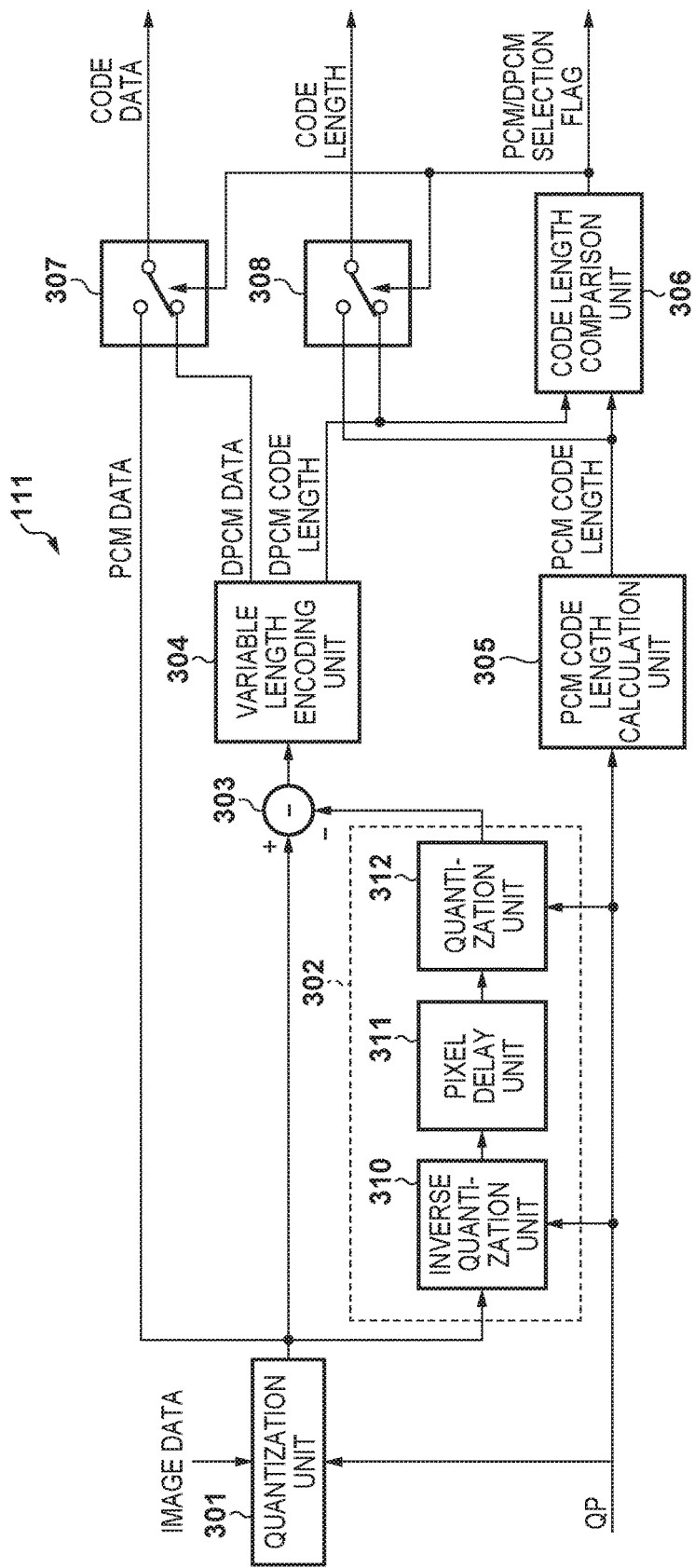
FIG. 3 is a block diagram for illustrating an example configuration of an image encoding unit corresponding to an embodiment of the invention.

Next, explanation is given with reference to FIG. 3 for a configuration and operation of the encoding unit 111 which is used commonly by the provisional encoding system 110 and the actual encoding system 120. FIG. 3 is a block diagram that illustrates an example configuration of the encoding unit 111. As illustrated in FIG. 3, the encoding unit 111 is configured to include, for example, a quantization unit 301, a prediction unit 302, a subtractor 303, a variable length encoding unit 304, a PCM code length acquiring unit 305, a code length comparison unit 306 and selectors 307 and 308.

Image data and a QP are input into the encoding unit 111. In the case of the provisional encoding system 110, a QP may be assigned in advance as a fixed value for each of the encoding units 111A-111D. In FIG. 1B a case in which 0, 1, 2 and 3 are assigned as QPs for the encoding units 111A-111D in that order is illustrated as an example. In the case of the provisional encoding system 110, each encoding unit may hold a QP value in advance. A QP set by the provisional encoding system 110 is input into the actual encoding system 120 from the QP deciding unit 115. Hereinafter, detailed explanation is given for specific configuration and operation of the encoding unit 111.

First, image data input into the encoding unit 111 is input into the quantization unit 301. The quantization unit 301 quantizes input image data in accordance with the provided QP, and outputs quantized data to the prediction unit 302, the subtractor 303 and a selector 307 respectively. In the present invention, quantization data that is quantized by the quantization unit 301 is referred to as PCM data. In the present embodiment, explanation is given assuming that the value of the QP is made to be an integer value for which a minimum value is made to be 0, and which can be changed in the range of 0-3; however, larger QP values may be set to use even larger quantization steps.

In the present embodiment, the quantization unit 301 makes a quantization step smaller (finer) the smaller the QP is, and makes a quantization step larger (coarser) the larger the QP is. When the QP increases by 1, a quantization is performed so that significant bits of the PCM data decrease 1 bit. For example, a quantization represented by Equation 1 is performed.

$$\text{Quant}=\text{Data}/(1<<\text{QP}) \quad \text{(Equation 1)}$$

(Quant: quantization data, Data: input image data, QP: quantization parameter)

Also, the 1<<QP indicates that the input image data is bit shifted by the number of bits indicated by the QP.

The significant bits and the values output for the QPs by the quantization as in Equation 1 are as follows.

QP=0: quantization step=1, the input data is output unchanged without being quantized. Significant bits are invariant.
QP=1: quantization step=2, the input data is quantized into ½. Significant bits are decreased by one bit.
QP=2: quantization step=4, the input data is quantized into ¼. Significant bits are decreased by 2 bits.
QP=n: quantization step=(1<<n), the input data is quantized into 1/(1<<n). Significant bits are decreased by n bits.

The foregoing Equation 1 indicates one example of quantization processing in the present embodiment, and the quantization processing is not limited to this. It is sufficient that it be a quantization such that the code length is decreased one bit whenever QP changes by 1. For example, a non-linear quantization may be performed. In the present embodiment, causing the value of QP to increase each time by 1 from QP=0 to QP=n is referred to as increasing the quantization step by 1 step, making the step larger, making the step coarser, or the like. Also, conversely, causing the value of QP to decrease each time by 1 from QP=n to QP=0 is referred to as decreasing the quantization step by 1 step, making the step smaller, making the step finer, or the like.

The PCM code length acquiring unit 305 uses Equation 2 below to decide the code length of the PCM data output from the quantization unit 301 from the number of bits in the image data (10 bits in the present embodiment) and the QP.

$$\text{PCM code length}=\text{number of bits of image data}-\text{QP} \quad \text{(Equation 2)}$$

In the present embodiment, whenever the value of QP is increased by 1, the PCM data code length is decreased by one bit. Accordingly, with an initial value of QP=0, whenever the QP is increased by 1, the code length of the PCM data is made shorter from the 10 bits by one bit. Here, the PCM code length is a fixed value because the value of QP is assigned fixedly for each of the encoding units 111A-111D in the provisional encoding system 110. Accordingly, configuration may be taken in which rather than the PCM code length acquiring unit 305 calculating the PCM code length by a calculation with Equation 2, a fixed value for the PCM code length based on the value of the assigned QP is held and output. The PCM code length acquiring unit 305 outputs the decided PCM code lengths to each of the code length comparison unit 306 and a selector 308.

Next, explanation is given for operation of the prediction unit 302. The prediction unit 302, as is illustrated in FIG. 3, is configured to include an inverse quantization unit 310, a pixel delay unit 311 and a quantization unit 312. After the PCM data that is inputted into the prediction unit 302 is temporarily inverse quantized by the inverse quantization unit 310, it is inputted into the pixel delay unit 311. In inverse quantization processing in the inverse quantization unit 310, the QP that the quantization unit 301 used for the image data quantization is used unchanged. The pixel delay unit 311 delays by a color component amount so that a previous value of the same color component becomes prediction data.

For example, in the present embodiment, the image data for each color component in RGB is inputted in order as illustrated in FIG. 4A, and after encoding of the image data G0, the image data of B0 and R1 are first encoded before next encoding G1. Thus, the pixel delay unit 311 causes 3 pixels worth of delay, and outputs the held image data that is inverse quantized to the quantization unit 312 at a timing at which G1 is encoded. The quantization unit 312 quantizes image data inputted from the pixel delay unit 311. At this point, because the QP that the quantization unit 301 uses when quantizing the image data G1 is inputted into the quantization unit 312, the quantization steps match between the quantization unit 301 and the quantization unit 312. A configuration that re-quantizes after the inverse quantization is performed in the prediction unit 302 is a configuration that is necessary to cause the quantization steps to match if the values of the QP differ between pixels, and that is necessary in the actual encoding system 120. On the other hand, because the QP is fixed in the provisional encoding system 110, the inverse quantization unit 310 and the quantization unit 312 may be omitted, leaving only the pixel delay unit 311. The quantization result in the quantization unit 312 is outputted to the subtractor 303 as prediction data. Note that because no previous pixel exists for the first pixel (R0, G0, B0) of the encoding block of each color component, a value of 0 is outputted as the prediction data.

The subtractor 303 outputs to the variable length encoding unit 304 a difference between the PCM data from the quantization unit 301 and the prediction data from the prediction unit 302 as prediction difference data. The prediction difference data is data that has a positive or negative value, and becomes a value close to 0 at level portions for which changes in the image data are small, an becomes a large value at an edge portion for which a change is large. The prediction difference data has a characteristic of a Laplace distribution centered at 0, generally.

The variable length encoding unit 304 performs encoding by a predetermined variable length encoding scheme on the inputted prediction difference data, and outputs code data and a code length for each pixel. The code data is outputted to the selector 307, and the code length is outputted to the code length comparison unit 306 and the selector 308 respectively. Huffman coding and Golomb coding, for example, are encompassed in the predetermined variable length encoding scheme. By the variable length encoding scheme that the variable length encoding unit 304 executes, code data of a shortest code length is assigned if the input value is 0, and the larger the absolute value of the input value becomes, the longer the code length of the code data becomes. Note that in the present embodiment, code data outputted from the variable length encoding unit 304 is referred to as DPCM data, and the code length of the same is referred to as a DPCM code length.

The code length comparison unit 306 compares the PCM code length and the DPCM code length in a pixel group unit as previously explained to generate a PCM/DPCM selection flag for selecting code data whose code length becomes smaller. The code length comparison unit 306 is configured so to hold a DPCM code length and a PCM code length of each color of R, G and B which configure a pixel group. The PCM/DPCM selection flag is output to the selector 307 and the selector 308, and is used for switching of output data by each selector. It is also output to the outside of the encoding unit 111.

The comparison of code lengths is performed in a pixel group unit as previously described. The comparison of code lengths in a pixel group unit specifically calculates as follows. Here, an example of execution for the data input of an RGB component format of FIG. 4A where the pixel of the group number 1 is made to be the target is illustrated.

```
S_PCM_R1: the PCM code length of R1
S_PCM_G1: the PCM code length of G1
S_PCM_B1: the PCM code length of B1
S_DPCM_R1: the DPCM code length of R1
S_DPCM_G1: the DPCM code length of G1
S_DPCM_B1: the DPCM code length of B1
PCM_DPCM_SEL_FLAG: the PCM/DPCM selection flag
S_PCM = S_PCM_R1 + S_PCM_G1 + S_PCM_B1
S_DPCM = S_DPCM_R1 + S_DPCM_G1 + S_DPCM_B1
if (S_PCM > S_DPCM)
    PCM_DPCM_SEL_FLAG = 1
else
    PCM_DPCM_SEL_FLAG = 0
```

For each pixel group, the code length comparison unit 306 totals the PCM code lengths and the DPCM code lengths to calculate group code length totals (S_PCM, S_DPCM). Next, it compares these, and if the total of the PCM code lengths is larger it sets a flag value to 1, and if the total of the DPCM code lengths is larger it sets the flag value to 0.

The PCM data and the DPCM data are inputted into the selector 307, and the code data whose code length is smaller is selected in accordance with the PCM/DPCM selection flag, and output to the outside of the encoding unit 111. Specifically, if the flag value of the PCM/DPCM selection flag is 1, the DPCM data is selected because the total of the DPCM code lengths is smaller; if the flag value is 0, the PCM data is selected because the total of the PCM code lengths is smaller. A PCM code length and a DPCM code length are inputted into the selector 308, and the code length whose code length is smaller is selected in accordance with the PCM/DPCM selection flag, and output to the outside of the encoding unit 111. Specifically, if the flag value of the PCM/DPCM selection flag is 1, the DPCM code length is selected; if the flag value is 0, the PCM code length is selected.

(Explanation of the Provisional Encoding System)

Returning to the explanation of the image encoding unit 20 of FIG. 1, explanation is given for provisional encoding processing in the provisional encoding system 110. For the image data inputted into the provisional encoding system 110 of FIG. 1, provisional encoding is performed with the QP as 0-3 respectively by each of the plurality of encoding units 111A-111D, and the code lengths are outputted to the QP deciding unit 115. These code lengths represent code lengths of code data into which the result of quantization that performed the quantization processing by the quantization step corresponding to the respective QP is encoded in PCM or DPCM. The encoding units 111A-111D have the configuration illustrated in FIG. 3, and code data, a code length, and a PCM/DPCM selection flag are present as an output signal; however, configuration may be taken to only use the code length in the provisional encoding system 110, and not use the code data or the PCM/DPCM selection flag.

Note that because 0-3 is made to be the range of the QP used for encoding in the present embodiment, the provisional encoding system 110 is provided with 4 of the encoding unit 111. However, embodiments of the invention are not limited to this configuration, and it is possible to change the number of the encoding unit 111 in accordance with the range of the QP used for encoding.

The QP deciding unit 115 decides the QP (application QP) to apply to a pixel group unit based on information of a plurality of code lengths for each QP input from the encoding units 111A-111D of the previous stage. Hereinafter, explanation is given of details of a method for deciding the application QP in the QP deciding unit 115.

Figure 5:
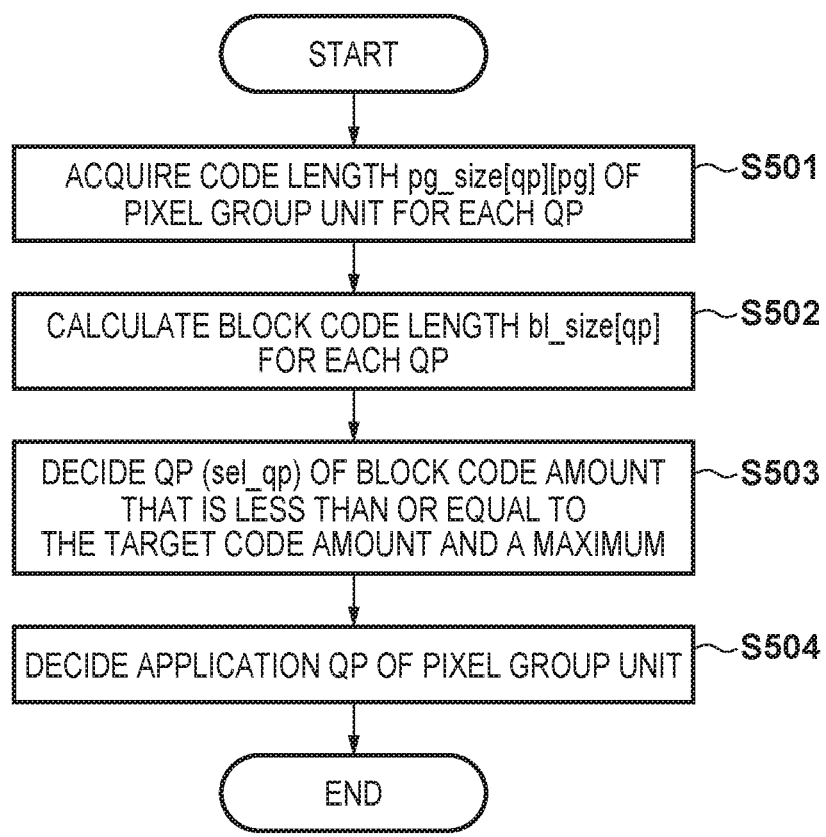
FIG. 5 is a flowchart that illustrates an example of a process in a QP deciding unit corresponding to an embodiment of the invention.

In the present embodiment, using FIG. 5, explanation is given of an overview of a processing procedure that the QP deciding unit 115 executes. When this processing in FIG. 5 is started for each encoding block, the QP deciding unit 115, in step S501, acquires, for a pixel group unit, code length information calculated for each QP assigned to a respective encoding unit from the encoding units 111A-111D. Hereinafter, the code length of the code data that is acquired will be represented as pg_size[qp][pg] whose elements are the value of QP: qp and the pixel group number: pg. qp takes a value from 0 to 3, and pg takes a value from 0 to 15.

Next, the QP deciding unit 115, in step S502, calculates the total code lengths of the encoding block for each QP. It is necessary to consider the code length of the header information which is multiplexed to the encoded data when calculating the code length of the encoding block overall. The header information is information of the PCM/DPCM selection flag and QP for each pixel group that is necessary for when decoding; in the present embodiment, the code length of the header information is a total of 48 bits: 2 bits to represent the QP (0-3)×16 pixel groups=32 bits, and 1 bit for the PCM/DPCM selection flag×16 pixel groups=16 bits. Here, because the code length of the header information can be predicted in advance as a fixed value irrespective of the value of the image data or the QP, the code length of the encoding block may be calculated excluding the code length of the header information.

A calculation of a block code length bl_size[qp] that adds a total of the code lengths of all pixel groups and the code length hd_size (=48 bits) of the header information is performed. FIG. 9A illustrates a specific example of values of pg_size[qp][pg] and bl_size[qp]. In FIG. 9A, a value (30) that a reference numeral 901 indicates, for example, is pg_size[0][0], and indicates the code length for the case where the head pixel group in the encoding block is encoded with the QP=0. Similarly, a value (18) that a reference numeral 902 indicates, for example, is pg_size[0][15], and indicates the code length for the case where the last pixel group in the encoding block is encoded with the QP=0. Also, a value that a reference numeral 903 indicates (382) is bl_size[0], and indicates a block code length in a case of encoding with QP=0; a value that a reference numeral 904 indicates (293) is bl_size[3], and indicates a block code length in the case of encoding with QP=3. These values are represented in units of bits. Explanation is given using the values of this figure as an example of specific values in the explanation that follows as well.

Figure 6:
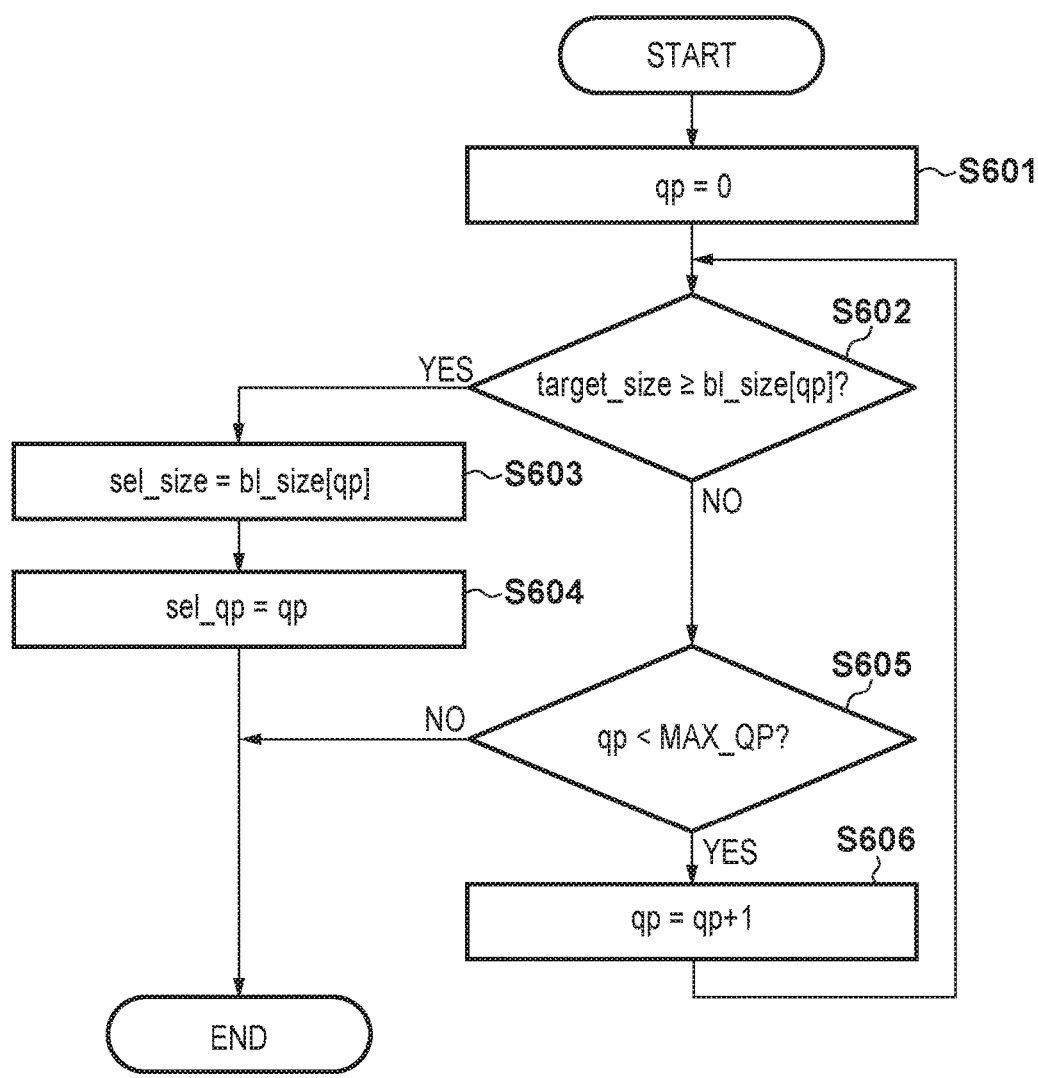
FIG. 6 is a flowchart that illustrates an example of processing of step S503 of FIG. 5.

Next, the QP deciding unit 115, in step S503, selects from bl_size[qp] into sel_size a block code length that is less than or equal to a predetermined target code amount target_size and that has a maximum value, and selects into sel_qp the qp in that case. The specific processing in step S503 is as is illustrated in the flowchart of FIG. 6.

First, in step S601, the QP deciding unit 115 initializes the value of QP: qp to 0. Next, the QP deciding unit 115, in step S602, compares the code length of an encoding block for the currently selected QP: bl_size[qp] and the target code amount: target_size. If the result of the comparison is that bl_size[qp] is less than or equal to target_size ("YES" in step S602), transition is made to step S603; if bl_size[qp] is larger than target_size ("NO" in step S602), transition is made to step S605.

In step S603, bl_size[qp] that became the determination target in step S602 is set to the block code length sel_size that should be selected. Next, in step S604, a value of the QP of bl_size[qp] is set to sel_qp which represents a provisional QP of the encoding block, and the processing terminates.

In step S605, it is determined whether or not the value of the QP that is currently selected is smaller than the maximum value (MAX_QP); if it is smaller than the maximum value ("YES" in step S605), the value of QP is updated by one in step S606, step S602 is returned to, and the processing continues. If the current value of QP is greater than or equal to the maximum value ("NO" in step S605), the processing terminates. In the present embodiment, the value of MAX_QP is 3. Note that no block code length that is smaller than the target code amount exists and a QP cannot be selected if NO is determined in step S605. However, in reality, it is possible to design so that a block code length that falls below the target code amount between the minimum value and the maximum value for QP is obtained by adjusting the value of the target code amount and the QP deciding range in advance based on the number of bits of image data.

In this fashion, the code length of the encoding block is compared with the target code amount in order while increasing the quantization step from 1 to 2, and 2 to 4 by updating by 1 each time from the initial value of QP=0. Then it is possible to make the first value of QP corresponding to the block code length that is less than or equal to the target code amount be the provisional QP value. Explanation is given having the specific value of the target code amount target_size be 360 bits explanatorily in the present embodiment. Because the information amount of the image data prior to encoding is 10 bits×3×16=480 bits, this value corresponds to ¾ of that. The size of the target code amount can be set optionally in accordance with a compression rate that is expected. In the example illustrated in FIG. 9A, 326 (bits), which is the block code length bl_size[2] where QP: 2, is less than the target code amount of 360 bits, it is selected as sel_size. Also, the value 2 of QP here is set to sel_qp. Here, if the code length of the header information is not included in the code length of the encoding block, the value of the target code amount becomes a value into which the code length of the header information is subtracted from 360 bits. Because in the above-described example the code length of the header is 48 bits, the target code amount in such a case becomes 312 bits.

Returning to the explanation of FIG. 5, the QP deciding unit 115, in step S504, adjusts in a pixel group unit the provisional QP value sel_qp of the encoding block decided in step S503. With this, it is possible to decide the application QP: pg_qp[pg] for pixel group units. Detail of the processing for deciding pg_qp[pg] in step S504 is explained in detail with reference to the flowchart of FIG. 7.

Figure 7:
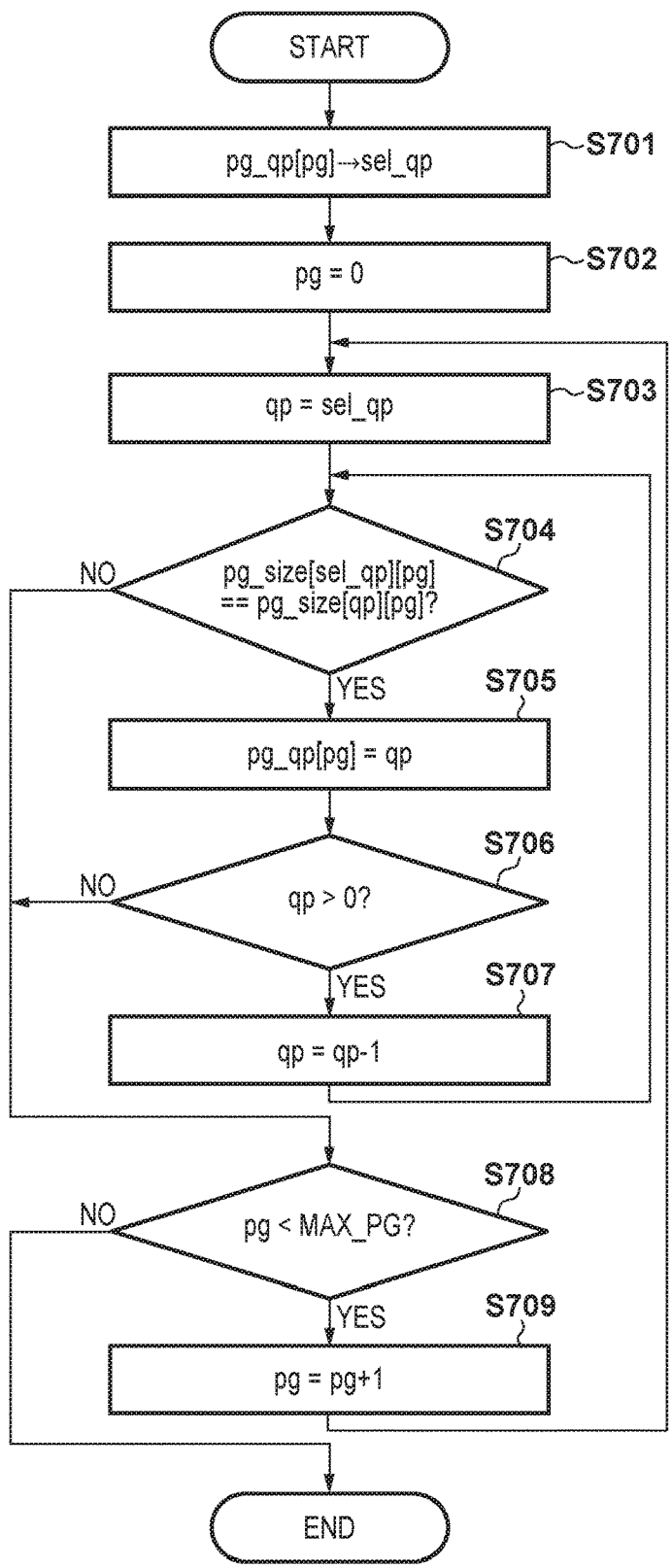
FIG. 7 is a flowchart that illustrates an example of processing of step S504 of FIG. 5.

In FIG. 7, the QP deciding unit 115, in step S701, initializes pg_qp[pg] which is the application QP for a pixel group unit with the provisional QP value sel_qp decided in step S503. Here all of pg_qp[0]-pg_qp[15] are initialized to the value of sel_qp. In the example of FIG. 9A, because the QP=2 is selected, pg_qp[0]-pg_qp[15] are all initialized to 2. Next, in step S702, the QP deciding unit 115 initializes a parameter pg indicating the number of the pixel group that is the target of processing. Because for pixel groups there are 16 groups from 0 to 15, initialization of pg=0 is performed.

Continuing on, the QP deciding unit 115, in step S703, initializes the value of a parameter qp which indicates the currently selected QP with the value of sel_qp, and transition is made to step S704. The QP deciding unit 115, in step S704, compares pg_size[qp][pg] and pg_size[sel_qp][pg], and determines whether or not both match. Here, pg_size[qp][pg] represent a code length for the values of the pixel group number pg and qp set in step S702 and in step S703. Also, pg_size[sel_qp][pg] represents a code length for the values of the pixel group number pg and the qp that matches sel_qp.

If it is determined in step S704 that both match ("YES" in step S704), transition is made to step S705, and the QP deciding unit 115 makes the value of qp at that point in time be the value of the pixel group unit application QP: pg_qp[pg]. After that, transition is made to step S706. Also, if it is determined in step S704 that both do not match ("NO" in step S704), transition is made to step S708. The QP deciding unit 115, in step S706, determines whether or not the value of qp is greater than the minimum value 0. If, in step S706, the value of qp is 0 ("NO" in step S706), transition is made to step S708. Meanwhile, if it is determined to be a value that is larger than 0 ("YES" in step S706), transition is made to step S707, the value of qp is reduced by 1, and the processing continues after returning to step S704. If, for example, qp is set to sel_qp=2, it is newly set to 1, step S704 is returned to, and it is determined whether or not the code lengths match.

Here, explanation is given with reference to FIG. 9A of a concrete example of processing from step S704 to step S707. In the example of FIG. 9A, it is assumed that sel_qp=2. First, if for the pixel group number pg=0, qp=sel_qp=2 is selected by initialization, then pg_size[sel_qp=2][0]=pg_size[qp=2][0]=24 in step S704. Thus, if YES is determined in step S704, qp=sel_qp=2 is set for the value of the application QP: pg_qp[0] in step S705. Next, because qp>0 in step S706, qp is reduced by 1, and becomes qp=1, and step S704 is returned to. In the second determination in step S704, the comparison target code length pg_size[qp][pg] becomes pg_size[1][0]=27. For the other code length pg_size[sel_qp][pg], pg_size[2][0]=24. When both are compared, pg_size[1][0]>pg_size[2][0], and NO is determined in step S704. Accordingly, the application QP: pg_qp[0] of the target of processing pixel group is not changed from qp=sel_qp=2, and the application QP for pixel group number: pg=0 becomes 2, and the code length is 24 (refer to FIG. 9B).

Next, focusing on the case where the pixel group number pg=8 of FIG. 9A, each code length for when QP is between 2 and 0 is pg_size[2][8]=pg_size[1][8]=pg_size[0][8]=pg_size[sel_qp2][8]=16. In such a case, YES is always determined in step S704, and the value of the application QP: pg_qp[8] is updated in order of 2, 1, 0 in step S705. Furthermore, while the code length, when the value of QP is 2 or 1, is invariant at 17 as in the case where the pixel group number pg=10 in FIG. 9A, if the code length becomes longer when the QP becomes 0, the update of the value of the application QP: pg_qp[10] stops at 1.

By the QP deciding unit 115 repeating the processing from step S704 to step S707 in this fashion, it is possible to decide a value that is smaller than the value of the application QP: pg_qp[pg] in a range in which the code length does not change for a pixel group unit. After that, in the processing of step S708 and step S709, the pixel group that is the target of processing is updated. Specifically, in step S708, the QP deciding unit 115 determines whether or not the number pg of the pixel group of the current target of processing is smaller than the maximum value (MAX_PG) for a pixel group number. The value of MAX_PG is 15 in the case of the present embodiment. Here, if pg is smaller than the maximum value ("YES" in step S708), transition is made to step S709, the QP deciding unit 115 updates pg by 1, and processing for deciding the application QP: pg_qp[pg] in a pixel group unit is performed for a new pixel group after returning to step S704. Meanwhile, if pg matches a maximum value ("NO" in step S708), this processing terminates. The value of the application QP decided in this fashion is outputted from the QP deciding unit 115 to the actual encoding system 120.

Specific values for the application QP decided by the foregoing processing are illustrated in FIG. 9B. In FIG. 9B, the QPs corresponding to the code lengths surrounded in the bold lines represent the application QPs decided for each pixel group. For the value of the application QP in a pixel group unit, pg_qp[0-7, 9, 11, 13 and 15] are 2, pg_qp[8, 12 and 14] are 0, and pg_qp[10] is 1. Because, the quantization step is smaller and the image quality is thus better the smaller the QP is even if the code lengths are the same, it is possible to improve the quality as much as possible in a pixel group unit without increasing the code length of the block on the whole.

(Explanation of Operation of the Actual Encoding System)

Next, explanation is given for operation of the actual encoding system 120 of FIG. 1. The same image data as the image data input into the provisional encoding system 110 is input into the actual encoding system 120 as well, but it is necessary to wait for the QP deciding unit 115 of the provisional encoding system 110 to decide and output the application QP. Thus, the input image data is input into a delay unit 121, and a delay of a predetermined number of processing cycles worth that is necessary for the provisional encoding system 110 to decide the application QP is performed. The image data after the delay is outputted from the delay unit 121 to the encoding unit 111E. With this, the encoding unit 111E can encode the encoding block, for which the provisional encoding system 110 decided the application QP, using that set application QP.

The encoding unit 111E has the same configuration as the encoding unit 111 illustrated in FIG. 3, and uses the application QP to perform actual encoding of the delayed image data. With this, code data of a code length that is the same as the block code length that the QP deciding unit 115 decided is generated, and output to the multiplexing unit 123 together with the PCM/DPCM selection flag and the code length. In the multiplexing unit 123, the code data, the code length and the PCM/DPCM selection flag from the encoding unit 111E, and the QP from the QP deciding unit 115 are inputted, and multiplexing is performed in accordance with a predetermined format for each encoding block.

Figure 10A:
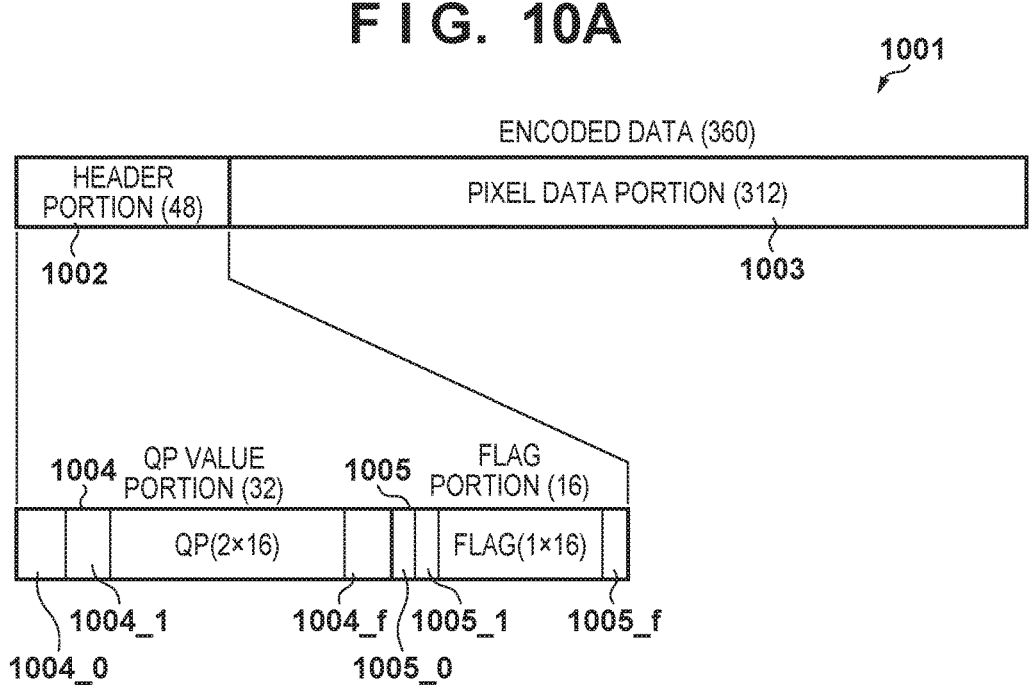
FIG. 10A and FIG. 10B are views that illustrate an example of a format of encoded data corresponding to an embodiment of the invention.

Hereinafter, explanation is given using FIG. 10A for an example of a format corresponding to embodiments of the invention. FIG. 10A is a view that represents a data structure of an encoding format, and a numerical value indicated by parentheses represents the number of bits of data stored in each region. Encoded data 1001 (360 bits) of the whole of the block is configured from a head portion 1002 (48 bits) and a pixel data portion 1003 (312 bits). The head portion 1002 is comprised by a QP value portion 1004 (32 bits) that stores values of QP, and a flag portion 1005 (16 bits) that stores PCM/DPCM selection flags. Sixteen 2-bit QPs (1004_0-1004_f) are stored for each pixel group in the QP value portion 1004. Sixteen 1-bit flag values for the PCM/DPCM selection flag (1005_0-1505_f) for each pixel group are stored in the flag portion 1005. The number of pixels worth (3×16=48 pixel's worth) of code data is stored in the pixel data portion 1003. The encoded data 1001 which is multiplexed is outputted as stream data to an output terminal 102, and image memory (not shown) is outputted to the bus interface.

(Explanation of Image Decoding Unit)

Figure 2:
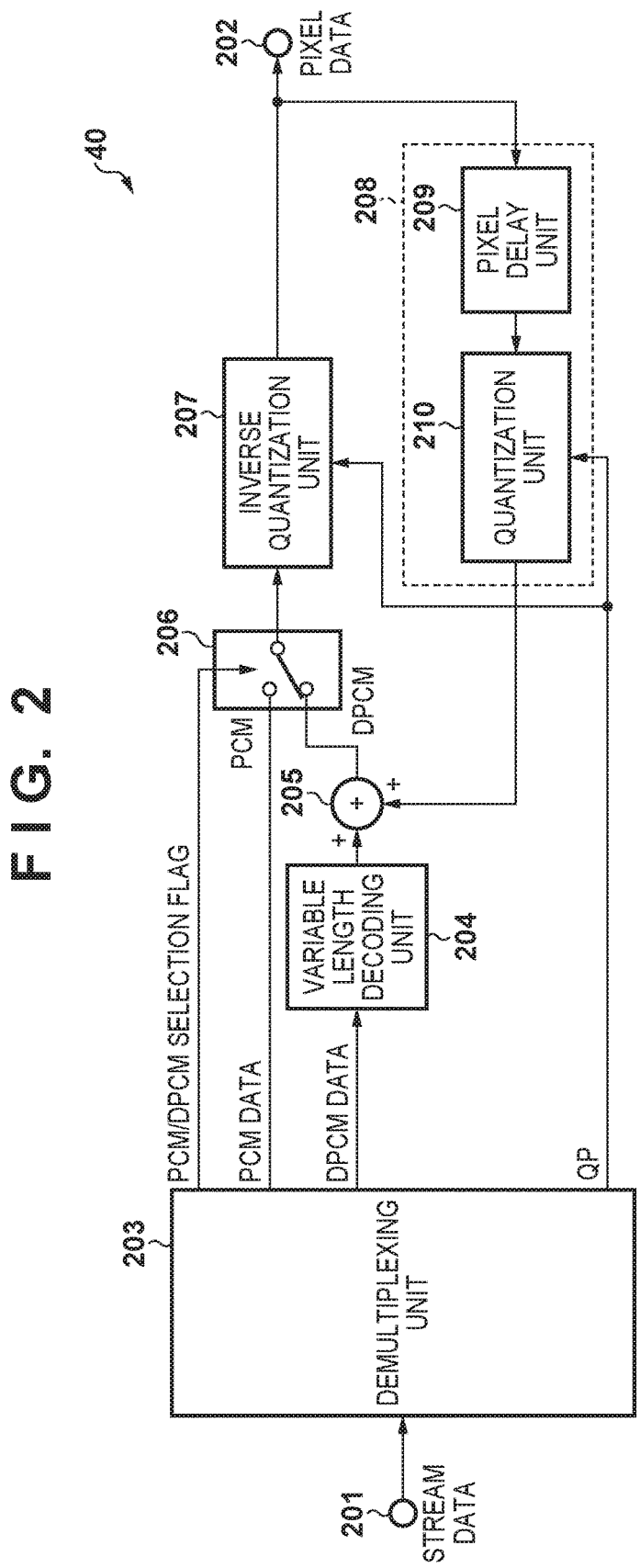
FIG. 2 is a block diagram for illustrating an example configuration of an image decoding unit corresponding to an embodiment of the invention.

Next, explanation is given for an example configuration and operation of an image decoding unit that corresponds to an embodiment of the invention and that decodes encoded data generated in the image encoding unit 20. FIG. 2 is a block diagram for illustrating an example configuration of the image decoding unit 40 corresponding to an embodiment of the invention. The image processing apparatus 100 has the image decoding unit 40, and can decode encoded data stored in the memory 30 thereby. Hereinafter, explanation is given for operation of each block in an example configuration of the image decoding unit of the present embodiment.

The image decoding unit 40 illustrated in FIG. 2 is comprised by a demultiplexing unit 203, a variable length decoding unit 204, an adder 205, a selector 206, an inverse quantization unit 207, and a prediction unit 208. The image decoding unit 40 may be configured integrally in hardware using memory, logic circuits and dedicated devices, or may be configured by distributing among a plurality of devices. Alternatively, it may be configured in software by a computer such as a CPU executing a processing program stored in a memory.

For the image decoding unit 40, stream data generated by the image encoding unit 20 is input into the demultiplexing unit 203 via an input terminal 201 by way of an image memory (not shown), a bus interface or the like. The demultiplexing unit 203 decodes the inputted stream data in accordance with a predetermined format, separates information of a QP, a PCM/DPCM selection flag and the code data, and outputs sequentially for each processing cycle. The QP is outputted to the inverse quantization unit 207 and a quantization unit 210, and the PCM/DPCM selection flag is outputted to the selector 206. From the code data, PCM data is outputted to the selector 206, and DPCM data is outputted to the variable length decoding unit 204. The variable length decoding unit 204 performs variable-length decoding of inputted DPCM data, and outputs decoded DPCM data to the adder 205. The adder 205 obtains a decoding value by adding a prediction value from the prediction unit 208 which is explained later to the decoded DPCM data, and outputs to the selector 206.

The selector 206 switches PCM data from the demultiplexing unit 203 and a decoding value from the adder 205 in accordance with the PCM/DPCM selection flag, and outputs as quantization data, outputting to the inverse quantization unit 207. The inverse quantization unit 207 uses the QP value to inverse quantize the quantization data from the selector 206 to generate decoded image data, and outputs to the prediction unit 208 and an output terminal 202. The prediction unit 208 is configured by a pixel delay unit 209 and the quantization unit 210. Decoded image data inputted from the inverse quantization unit 207 is delayed by a color component's worth in the pixel delay unit 209, quantized in the quantization unit 210, and output as a prediction value so that the previous value of the same color component becomes the prediction value. Note that because no previous pixel exists for the first pixel of the encoding block of each color component, a value of 0 is outputted as the prediction value. Decoded image data outputted from the inverse quantization unit 207 is outputted to the outside via the output terminal 202.

As explained above, to perform encoding of a fixed length for each encoding target encoding block consisting of a plurality of pixel groups, first provisional encoding is performed with a plurality of QPs in the provisional encoding system to obtain encoded data amounts, and then the values QP to apply to pixel group units are decided in accordance with those encoded data amounts. A configuration is taken such that next, in the actual encoding system, actual encoding is performed using the application QPs that are decided. With this, it is possible to decide the value of the QP of each pixel group so that the block code length of an encoding block becomes a maximum value that does not exceed the predetermined value. Also, because it is possible to make a value of a QP a smaller value in a range in which the code length does not change for each pixel group, it is possible to cause the image quality to increase for a pixel group unit without influencing the block code length.

Also, configuration is taken in which the QP and PCM/DPCM selection flag used when encoding are selectable (switchable) for a pixel group unit. And, configuration is taken to calculate code lengths for both PCM and DPCM in each pixel group and to select, in accordance with an adjacent pixel differential, the encoding scheme for which the code length becomes smaller rather than selecting DPCM in a case where the differential is small, and selecting PCM in a case where the differential is large. With this, efficient encoding in units of blocks becomes possible.

Also, in the present embodiment, even if the differential between adjacent pixels becomes large, the code length is not forcibly made to be halved from 10 bits to 5 bits in the case of PCM encoding as in Japanese Patent Laid-Open No. 2010-004514. Instead, the shorter code length in the PCM and DPCM encoding results is selected for each pixel group using a plurality of quantization steps set in a stepwise fashion including a quantization step 1. Furthermore, in the present embodiment, the quantization step is selected considering the block code length of the encoding block and not only the code length of a group unit. With this, even if the code length becomes larger in some of pixel groups, this is accordingly cancelled out if the code length of another pixel group is smaller. Thus, even if a sharp edge is included within an encoding block and a large code length is expended by that edge component, if before and after the edge is level, the code length of that edge will be absorbed thereby. As a result, there ceases to be a need to reduce bits unnecessarily as in Japanese Patent Laid-Open No. 2010-004514 when encoding edge components.

In embodiments of the above-described invention, the number of bits of image data is not limited to 10 bits, and a different number of bits such as eight bits or 12 bits may be used. Also, the block size is not limited to 16 horizontal pixels×1 vertical pixel, and may be any size. For example, it may be made to be a two-dimensional structure such as 4 horizontal pixels×4 vertical pixels.

Furthermore, the format of the encoding target image data is not limited to RGB image data, and may be an image data format such as one for gray-scale images, or for color images, YCbCr or Bayer array data. FIG. 4B illustrates a relationship between pixel groups and pixel data that configures encoding blocks in a case where the image data format is YCbCr4:2:2 with a luminance signal (Y) and two color-difference signals (Cr, Cb). In FIG. 4B, an example is illustrated in which a total of 4 pixels—2 pixels for Y and 1 pixel each for Cb and Cr—is made to be a unit pixel group, and an encoding block is configured from 4×8=32 pixels. Here, the number of pixel groups included in an encoding block may be more than 8 groups. FIG. 4C illustrates a relationship between pixel groups and pixel data that configures encoding blocks in a case where the image data format is a Bayer arrangement. In FIG. 4C, an example is illustrated in which a total of 4 pixels—2 pixels for G and 1 pixel each for R and B—is made to be a unit pixel group, and an encoding block is configured from 4×8=32 pixels. Here, the number of pixel groups included in an encoding block may be more than 8 groups. For a gray-scale image, it is possible to configure a pixel group from a set of adjacent pixels among the pixels that configure the gray-scale image (not shown). In such a case, it is possible to include adjacent pixels, for example 3 pixels or 4 pixels, in a unit pixel group.

[Second Embodiment]

Next, explanation is given of another embodiment of the invention. A point of difference between the second embodiment and the above described first embodiment is in the processing internal to the QP deciding unit 115 of the image encoding unit 20, and configuration and operation of other encoding units, delay units and multiplexing units is the same as in the first embodiment, and thus explanation is omitted.

In this embodiment, a summary of a processing procedure of the QP deciding unit 115 is essentially the same as what is illustrated in FIG. 5 and FIG. 6. However, in the present embodiment, the method of deciding the application QP of a pixel group unit in step S504 differs to in the first embodiment. Detail of the processing corresponding to the present embodiment is as is illustrated in the flowchart of FIG. 8.

Figure 8:
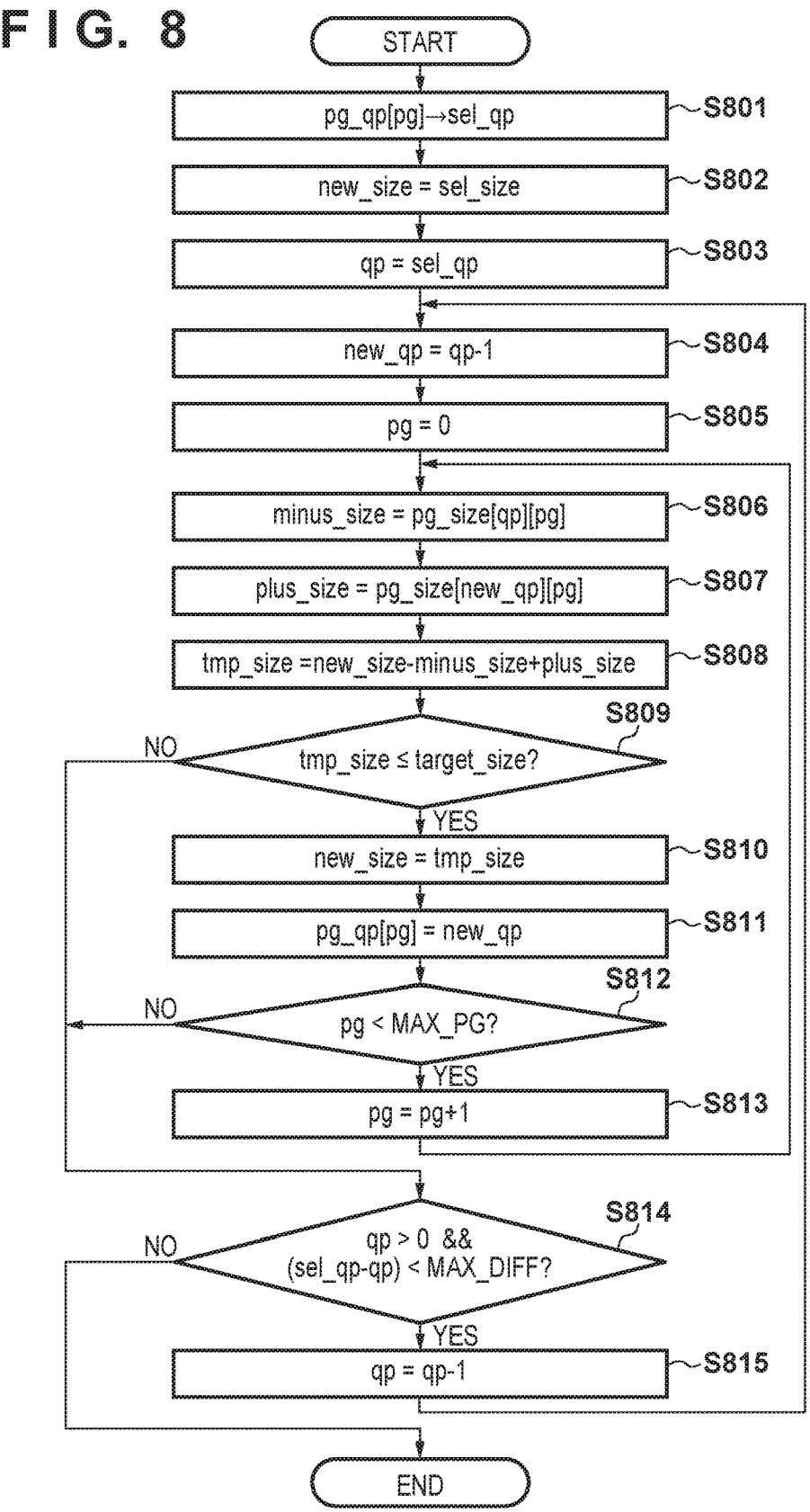
FIG. 8 is a flowchart that illustrates another example of processing of step S504 of FIG. 5.

In FIG. 8, the QP deciding unit 115, in step S801, initializes pg_qp[pg] which is the application QP for a pixel group unit with the provisional QP value sel_qp decided in step S503. Here all of the values of sel_qp from pg_qp[0]-pg_qp[15] are initialized. In the example of FIG. 9A, because the QP=2 is selected, pg_qp[0]-pg_qp[15] are all initialized to 2. Next, in step S802, the QP deciding unit 115 initializes a parameter new_size which represents a code length of the encoding block at the current time to the value of sel_size decided in step S603. For example, in the example of FIG. 9A, the value of new_size is initialized to 326 in step S802 because sel_size is set to a block code length 326 when QP is 2. The block code length becomes 278 if the header code length is not considered. Next, the QP deciding unit 115, in step S803, initializes the value of the parameter qp which indicates the currently selected QP with the value of sel_qp decided in step S604. For example, in the example of FIG. 9A, the value of qp is initialized to 2 in step S803 because sel_qp is set to 2.

Next, the QP deciding unit 115, in step S804, initializes the value of a parameter new_qp which indicates a new QP with a value that reduces qp by 1. new_qp indicates a value that lowers the value of qp that is currently selected by one. Furthermore, in step S805, the QP deciding unit 115 initializes a parameter pg indicating the number of the pixel group that is the target of processing. Because for pixel groups there are 16 groups from 0 to 15, initialization of pg=0 is performed. Furthermore, the QP deciding unit 115, in step S806 and in step S807, sets minus_size to pg_size[qp][pg], and sets plus_size to pg_size[new_qp][pg]. Here, minus_size indicates a code length of selected pixel group based on the current qp value, and plus_size indicates a code length of a selected pixel group based on the value of new_qp which reduces the current qp by 1. For example, in a case in which pg=0 and qp=2 is considered, minus_size becomes 24 and plus_size becomes 27 in the example illustrated in FIG. 9A. These minus_size and plus_size are used to calculate the amount of change in the block code length of an encoding block expected in a case where qp is changed by only 1 for a pixel group unit.

In step S808, the QP deciding unit 115 obtains a parameter tmp_size which indicates a block code length in a case where qp is changed by 1 for a pixel group unit by Equation 3 from the foregoing new_size, minus_size and plus_size.

tmp_size=new_size to minus_size+plus_size     (Equation 3)

For example, if a case where pg=0 and qp=2 is considered, tmp_size=329 because new_size=326, minus_size=24, and plus_size=27 in the example of FIG. 9A.

Next, the QP deciding unit 115, in step S809, determines whether or not tmp_size which is the code length for after qp changes and is obtained in step S808 is less than or equal to the target code amount (target_size). If the value of tmp_size exceeds the target code amount ("NO" in step S809), transition is made to step S814. Meanwhile, if the value of tmp_size is less than or equal to the target code amount ("YES" in step S809), transition is made to step S810. In step S810, the QP deciding unit 115 updates the value of new_size with the value of tmp_size. Next, in step S811, the QP deciding unit 115 updates the application QP: pg_qp[pg] of the pixel group which is the target of processing with the value of new_qp. After that, in the processing of step S812 and step S813, the pixel group that is the target of processing is updated. Specifically, in step S812, the QP deciding unit 115 determines whether or not the pixel group number pg that is the current target of processing is smaller than the maximum value (MAX_PG) for a pixel group number. The value of MAX_PG is 15 in the case of the present embodiment. Here, if pg is smaller than the maximum value ("YES" in step S812), transition is made to step S813, the QP deciding unit 115 updates pg by 1, and processing for deciding the application QP: pg_qp[pg] in a pixel group unit is performed for a new pixel group after returning to step S806. Meanwhile, if pg matches a maximum value ("NO" in step S813), transition is made to step S814.

Next, in step S814, the QP deciding unit 115 determines whether or not the current qp value is larger than 0, and determines whether or not a value that subtracts the current qp from sel_qp is smaller than MAX_DIFF. MAX_DIFF defines a number of times that it is possible to lower qp from sel_qp. MAX_DIFF can be decided optionally in accordance with a range of values that QP takes, and can be made to be 2, for example; in such a case, it is possible to lower the value of qp from the value of sel_qp up to 2 times. Because sel_qp=2 in the foregoing example, it is possible to perform processing until qp=0. Hypothetically, if sel_qp=3, it would be possible to reduce until qp=1, but it would not be possible to reduce until qp=0. Also, MAX_DIFF may be made to be 1 or 3. Restricting the number of times in this fashion is for restricting the recursive processing execution time. By setting MAX_DIFF, it is possible to define the number of types of QP that can be included in the application QP by adding to sel_qp.

If, in step S814, qp is 0 or if the number of times that qp was lowered matches MAX_DIFF ("NO" in step S814), the QP deciding unit 115 terminates this processing. If qp is larger than 0 and the number of times that qp was lowered does not reach MAX_DIFF ("YES" in step S814), transition is made step S815. In step S815, the QP deciding unit 115 reduces the value of qp by 1, step S804 is returned to, and the processing repeats. The application QP decided in this fashion is outputted from the QP deciding unit 115 to the actual encoding system 120.

Here, explanation is given with reference to FIG. 9A of a concrete example of processing in FIG. 8. First, based on the selected sel_size (326 in the example of FIG. 9A), the block code length (326−24+27=329) in a case where the value of QP of the pixel group of the pixel group number 0 is made smaller by 1 is calculated, and compared with the target code amount (360). If the calculated block code length is less than or equal to the target code amount, a block code length for a case where the QP of the subsequent pixel group number 1 is made smaller by 1 is calculated, and compared with the target code amount similarly. The block code length of the pixel group number 1 calculated here is (329−24+27=332), which is smaller than the target code amount. In this fashion, block code lengths are calculated by selecting pixel groups in order as follows.

Pixel group number 2: 332−24+27=335
Pixel group number 3: 335−18+22=339
Pixel group number 4: 339−19+23=343
Pixel group number 5: 343−15+18=346
Pixel group number 6: 346−13+15=348
Pixel group number 7: 348−13+15=350
Pixel group number 8: 350−16+16=350
Pixel group number 9: 350−18+22=354
Pixel group number 10: 354−17+17=354
Pixel group number 11: 354−15+18=357
Pixel group number 12: 357−12+12=357
Pixel group number 13: 357−16+20=361

In the foregoing calculated block code length, a block code length of a pixel group number 13 exceeds the target code amount. Accordingly, after this, the pixel group number 0 is returned to once again, the value of QP is caused to be further decreased by 1, and the block code length is calculated similarly. However, if MAX_DIFF=1, processing terminates at this point in time.

Pixel group number 0: 357−27+30=360
Pixel group number 1: 360−27+30=363

Here, the target code amount is exceeded for the pixel group number 1. Because the value of qp at this point in time is 0, the processing terminates. Specific values for the application QP that are decided in this way are illustrated in FIG. 9C. In FIG. 9C, the QPs corresponding to the code lengths surrounded in the bold lines represent the application QPs decided for each pixel group. For each value of the application QP of a pixel group unit, pg_qp[0] is 0, pg_qp[1-12] is 1, and pg_qp[13-15] is 2. In this fashion, in the present embodiment, a QP that is smaller is assigned according to the order from the head pixel group. While the QP=0 is assigned for only the head pixel group in FIG. 9C, it is possible to assign a minimum QP to a plurality of pixel groups that are consecutive including the head pixel group under another condition. In the foregoing example, explanation is given for a case that considers a code length of header information; in cases where the code length of the header information is not considered, the 48 bits code length of the header information can be subtracted from the foregoing numerical value as appropriate.

As explained above, in the present embodiment, it is possible to change the QP to a smaller value in order from the head pixel group within a range in which the total encoded data amount of the block does not exceed the target code amount in the method of deciding an application QP of a pixel group unit of step S504 in the QP deciding unit 115. In particular, in the present embodiment, it is possible to improve the quality of the encode result while reducing as much as possible unused bits by adjusting the QP within a range in which the block code amount does not exceed the predetermined value in a direction that results in high quality. Specifically, when compared with the case of the first embodiment, it is possible to assign 312 bits for image data in the present embodiment whereas the number of bits assigned for image data in the method of the first embodiment is 278 bits. Also, whereas in the first embodiment the rate at which QP=1 or 0 is used is $4/16$, it is $13/16$ in this embodiment. With this, because it is possible to increase the proportion of usage of a QP whose quantization step is small, and reduce the number of bits that are unused, it is possible to further decrease a degradation of image quality due to encoding.

[Third Embodiment]

Next, explanation is given for another embodiment of the invention. A point of difference between the third embodiment and the above-described second embodiment is the processing method internal to the multiplexing unit 123, and because configuration and operation of other encoding units, the QP deciding unit, the delay unit, and the multiplexing unit are the same as in the second embodiment, explanation is omitted.

In the multiplexing unit 123, the code data, the code length and the PCM/DPCM selection flag from the encoding unit 111E, and the QP from the QP deciding unit 115 are inputted, and multiplexing is performed in a predetermined format for each encoding block. Here, for the QP from the QP deciding unit 115, as explained in the second embodiment, there are regularities such as pg_qp[0]=0,
pg_qp[1-12]=1
pg_qp[13-15]=2.

In the first embodiment, as is illustrated in FIG. 10A, 32 bits worth are prepared for a region 1004 that stores the QP. However, in the example of the second embodiment, it is possible, without storing all QPs, to restore a QP arrangement pattern in an encoding block if there is information of the head (pixel group number: 0) QP and the pixel group number indicating the positions that the QP switches. Accordingly, the head QP, the pixel group number where the QP changes the first time, and the pixel group number that the QP changes the second time are stored in the header as qp0, qp_pos1 and qp_pos2. Reduction of the header code length by such a format becomes possible.

Also, above, the head QP, that is the lowest QP, was made to be the QP value that should be stored, but the same effect can be achieved in the case where it is made to be the maximum QP that is assigned. This is because even in such a case, it is possible to reproduce a correct QP assignment if the switching positions can be identified.

Figure 10B:
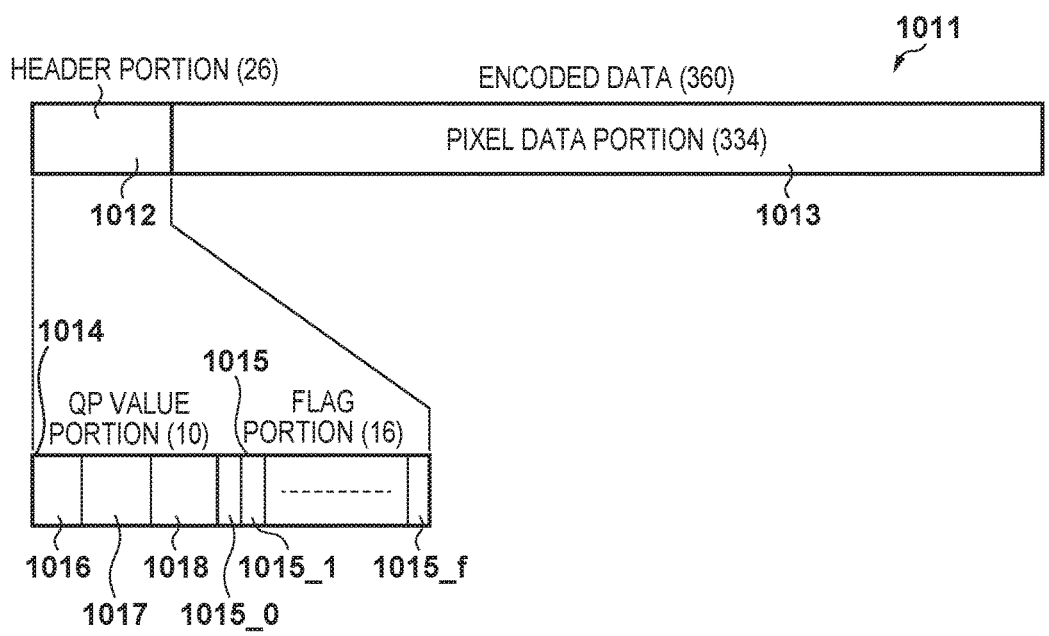

Explanation is given of an example of a header format corresponding to the present embodiment using FIG. 10B. FIG. 10B is a view that illustrates an example of a data structure of an encoding format, and encoded data 1011 for the block on the whole (360 bits) is comprised from a head portion 1012 (26 bits) and a pixel data portion 1013 (334 bits). The head portion 1012 is comprised by a QP value portion 1014 (10 bits) that stores values of QPs, and a flag portion 1015 (16 bits) that stores PCM/DPCM selection flags. In the QP value portion 1014, 2 bits (1016) for qp0, 4 bits for qp_pos1 (1017), and 4 bits for qp_pos2 (1018) are stored. In the example of FIG. 9C, the values (0, 1, 13) are stored. Sixteen 1-bit flag values for the PCM/DPCM selection flags (1005_0-1505_f) for each pixel group are stored in the flag portion 1015. The number of pixels worth (3×16=48 pixel's worth) of code data as variable-length code is stored in the pixel data portion 1013. The encoded data 1011 which is multiplexed is outputted as stream data to the output terminal 102, and is outputted to image memory or a bus interface (not shown).

In the header format illustrated in FIG. 10B, because the header code length is 26 bits and the pixel data portion code length is 334 bits, the method of calculating the block code length and the target code amount value in the foregoing embodiment are different. Specifically, if the header code length is considered in the calculation of the block code length bl_size[qp] in step S502 of FIG. 5, its size is made to be 26 bits. If the header code length is not considered in the block code length calculation, the target code amount of step S503 is made to be 334 bits.

In FIG. 10B, a case in which 2 pieces of information of QP switching positions are caused to be held in the header portion is explained; however, the number of pieces of information of switching positions that should be included in the header portion depends on the value of MAX_DIFF which is used in the determination in step S814 of FIG. 8. FIG. 10B illustrates a case in which MAX_DIFF=2, but if MAX_DIFF=1, it suffices to have 4 bits for qp_pos1 as the information of the position of switching, and therefore it is possible to reduce further the size of the head portion 1012 by 4 bits, and to increase further the size of the pixel data portion 1013 by 4 bits.

As explained above, in the present embodiment, when storing the QP in the header in the multiplexing unit 123, information of the initial value of QP, and the positions at which QP switches are stored rather than storing the values of QP in the header unchanged. Thereby it is possible to reduce the code length of the header portion and to cause the size of the pixel data included in the encoded data to increase. As a result it is possible to increase the proportion of usage of a QP whose quantization step is small, and further decrease a degradation of image quality due to encoding.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-092371, filed Apr. 28, 2015, which is hereby incorporated by reference herein in its entirety.

What is claimed is:

1. An image processing apparatus comprising:
one or more processors,
a memory; and
one or more programs stored in the memory including instructions which, when executed by the one or more processors, cause the image processing apparatus to perform operations of:
acquiring an encoding target block having a plurality of groups each including a predetermined number of pixels;
deciding for each group a quantization parameter used to quantize image data of the group and an encoding scheme so that a code length of the encoding target block does not exceed a predetermined value; and
generating encoded data by encoding image data of the encoding target block in accordance with the quantization parameters and the encoding schemes decided for the respective groups in the deciding,
wherein a first encoding scheme that outputs quantized image data and a second encoding scheme that outputs encoded data of a differential between quantized image data and prediction data are used in the generating encoded data,
wherein the deciding decides, as the encoding scheme of the respective groups, whichever of the first encoding scheme and the second encoding scheme that can obtain a smaller code length, and
wherein in the deciding, the quantization parameter of the respective groups is decided as, either a first quantization parameter or a second quantization parameter corresponding to a quantization step smaller than a quantization step corresponding to the first quantization parameter, out of a plurality of quantization parameters, and
wherein in the deciding, one of the plurality of quantization parameters is decided as the first quantization parameter so that a code length of encoded data of the encoding target block generated by quantizing all of the groups of the encoding target block using the first quantization parameter, and encoding the respective groups using the encoding schemes decided for the respective groups does not exceed the predetermined value, and becomes a maximum value, and decides the second quantization parameter is decided as a quantization parameter for same of the groups of the encoding target block.

2. An apparatus according to claim 1, wherein
in the deciding, the some of the groups is decided so that a total of a first total and a second total does not exceed the predetermined value, and becomes a maximum value,
wherein the first total is a total of code lengths of encoded data generated by quantizing the some of the groups of the encoding target block using the second quantization parameter, and encoding the some of the groups respectively using the decided encoding schemes, and the second total is a total of code lengths of encoded data generated by quantizing others of the groups using the first quantization parameter, and encoding the others of the groups respectively using the decided encoding schemes.

3. An apparatus according to claim 1, wherein the operations further comprising:
multiplexing the encoded data of the encoding target block and additional information generated in the generating, and to output stream data including the encoded data and the additional information, and
wherein the additional information includes first information for identifying each quantization parameter of the plurality of groups of the encoding target block, and second information for identifying each encoding scheme of the plurality of groups included in the encoding target block.

4. An apparatus according to claim 3, wherein
the first information indicates either the first quantization parameter or the second quantization parameter, and a switching position of the some of the groups and the others of the groups.

5. An apparatus according to claim 1, wherein
in the deciding, the second quantization parameter is decided as the quantization parameter of at least a head group out of the plurality of groups of the encoding target block.

6. An apparatus according to claim 5, wherein
in the deciding, the second quantization parameter is decided as the quantization parameter of a plurality of consecutive groups including the head group out of the plurality of groups of the encoding target block.

7. An apparatus according to claim 6, wherein in the deciding, the first quantization parameter is decided as the quantization parameter of the groups other than the plurality of consecutive groups including the head group out of the plurality of groups of the encoding target block.

8. An apparatus according to claim 1, wherein
in the deciding, one of the plurality of quantization parameters is further decided as a third quantization parameter, so that a code length of encoded data of the encoding target block does not exceed the predetermined value and becomes a maximum value, wherein the encoded data is generated by:
quantizing a first group of the encoding target block using the second quantization parameter;
quantizing a second group using the third quantization parameter corresponding to a quantization step smaller than that of the second quantization parameter;
quantizing the other groups using the first quantization parameter; and encoding each group using the respective encoding schemes decided for each group.

9. An apparatus according to claim 1, wherein the second quantization parameter is a quantization parameter corresponding to a quantization step that is next largest after the first quantization parameter out of the plurality of quantization parameters.

10. An apparatus according to claim 1, wherein in the plurality of quantization parameters a quantization result becomes 1 bit smaller if the quantization parameter increases by 1.

11. An apparatus according to claim 1, wherein the image data includes pixels of a plurality of colors and a group includes pixels of different colors.

12. An image processing method comprising:
acquiring an encoding target block having a plurality of groups each including a predetermined number of pixels;
deciding for each group a quantization parameter used to quantize image data of the group and an encoding, scheme so that a code length of the encoding target block does not exceed a predetermined value; and
generating encoded data by encoding image data of the encoding target block in accordance with the quantization parameters and the encoding schemes decided for the respective groups,
wherein a first encoding scheme that outputs quantized image data and a second encoding scheme that outputs encoded data of a differential between quantized image data and prediction data are used in the generating encoded data,
wherein the deciding decides, as the encoding scheme of the respective groups, whichever of the first encoding scheme and the second encoding scheme that can obtain a smaller code length, and
wherein in the deciding, the quantization parameter of the respective groups is decided as, either a first quantization parameter or a second quantization parameter corresponding to a quantization step smaller than a quantization step corresponding to the first quantization parameter, out of the plurality of quantization parameters, and
wherein in the deciding, one of the plurality of quantization parameters is decided as the first quantization parameter so that a code length of encoded data of the encoding target block generated by quantizing all of the groups of the encoding target block using the first quantization parameter, and encoding using the encoding schemes decided for the respective groups does not exceed the predetermined value, and becomes a maximum value, and the second quantization parameter is decided as a quantization parameter for some of the groups of the encoding target block.

* * * * *